United States Patent
Ishida

(10) Patent No.: US 7,502,493 B2
(45) Date of Patent: Mar. 10, 2009

(54) IMAGE PROCESSING APPARATUS AND METHOD AND PROGRAM STORAGE MEDIUM

(75) Inventor: Yoshihiro Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 10/617,042

(22) Filed: Jul. 11, 2003

(65) Prior Publication Data

US 2004/0022435 A1   Feb. 5, 2004

(30) Foreign Application Priority Data

Jul. 30, 2002   (JP)   ............................. 2002-220764

(51) Int. Cl.
*G06K 9/00* (2006.01)
*G06K 9/36* (2006.01)
*G06K 9/32* (2006.01)
*G06F 3/033* (2006.01)
*G09G 5/00* (2006.01)

(52) U.S. Cl. ........................ 382/118; 382/289; 382/296; 345/158; 345/655

(58) Field of Classification Search ................ 382/118, 382/289, 296; 345/158, 655, 165
See application file for complete search history.

(56) References Cited

U.S. PATENT DOCUMENTS

| | | | | |
|---|---|---|---|---|
| 6,345,110 B1 * | 2/2002 | Niyogi et al. | ............... | 382/118 |
| 6,597,817 B1 * | 7/2003 | Silverbrook | ................ | 382/289 |
| 7,017,115 B2 * | 3/2006 | Hayashi | ...................... | 715/738 |
| 7,050,607 B2 * | 5/2006 | Li et al. | ....................... | 382/118 |
| 7,375,755 B2 * | 5/2008 | Oya et al. | .............. | 348/333.02 |
| 2001/0019620 A1 * | 9/2001 | Nagai et al. | .................. | 382/104 |
| 2001/0032075 A1 | 10/2001 | Yamamoto | .................. | 704/256 |
| 2003/0123713 A1 * | 7/2003 | Geng | ......................... | 382/118 |
| 2005/0063566 A1 * | 3/2005 | Beek et al. | .................. | 382/115 |

FOREIGN PATENT DOCUMENTS

| | | |
|---|---|---|
| EP | 1 128 316 A1 | 8/2001 |
| JP | 8-63595 | 3/1996 |
| JP | 2000-123164 | 4/2000 |
| JP | 2000-123165 | 4/2000 |
| JP | 2001-282283 | 10/2001 |
| JP | 2001-309225 | 11/2001 |

* cited by examiner

*Primary Examiner*—Jingge Wu
*Assistant Examiner*—Kathleen S Yuan
(74) *Attorney, Agent, or Firm*—Fitzpatrick, Cella, Harper & Scinto

(57) ABSTRACT

According to the present invention, the face of a subject person can be rapidly detected. An image input unit inputs an image to be processed. A photographing-position input unit inputs photographing-position information attached to the processed image. An angle-range information determination unit determines an angle range, where face detection should be performed to the processed image, on the basis of the information obtained by the photographing-position information input unit. On the basis of information indicating the determined angle range, under the control of a process control unit, a face detection unit performs face detection to the processed image input by the image input unit in predetermined angle increments. A face integration unit integrates all of face data detected by a basic-angle-range face detection unit into face information and then outputs the information.

11 Claims, 9 Drawing Sheets

FIG. 7A
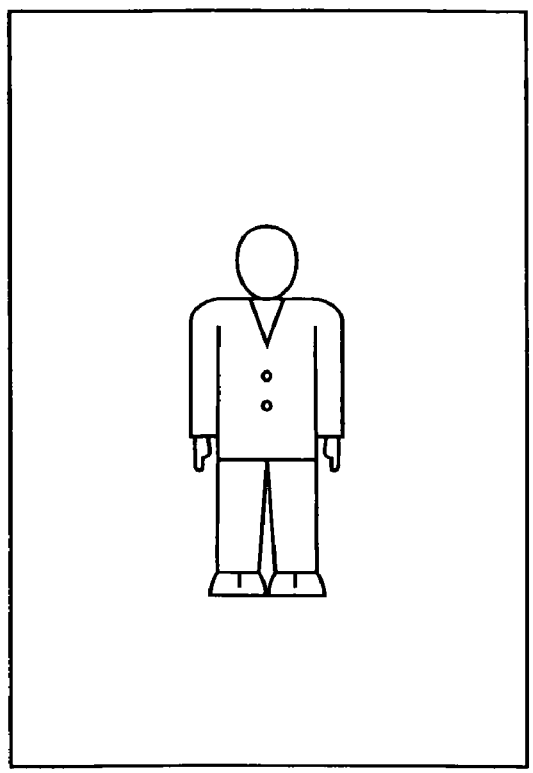
FIG. 7B
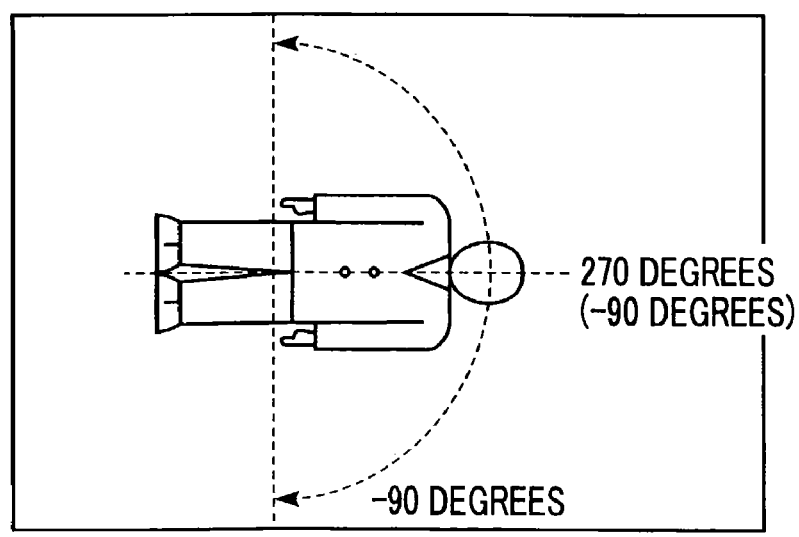

FIG. 8A
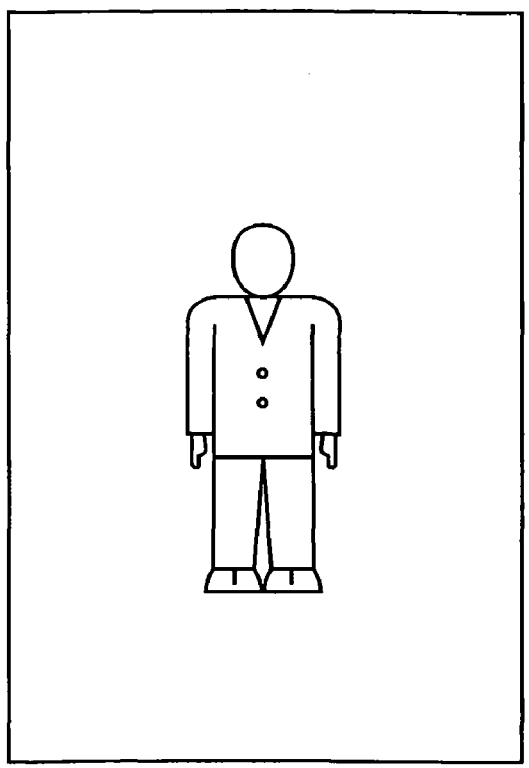
FIG. 8B
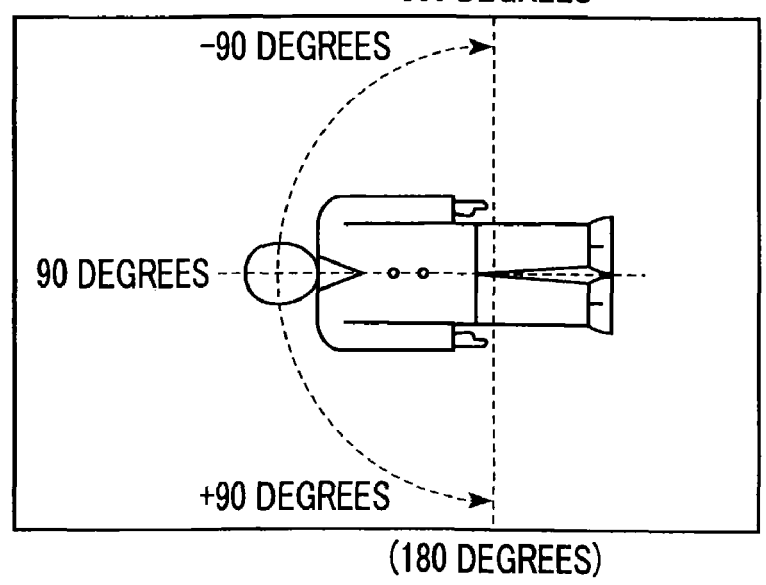

IMAGE PROCESSING APPARATUS AND METHOD AND PROGRAM STORAGE MEDIUM

BACKGROUND OF THE INVENTION

1. Field of the Invention

The present invention relates to an image processing apparatus and method used to determine whether an image to be processed is obtained by photographing a person as a primary subject, the apparatus and method for detecting the face of a person included in an image read by an image input device such as an imaging device.

2. Description of the Related Art

Imaging devices, particularly, digital still cameras (hereinbelow, referred to as digital cameras), which are being widely spread recently, each include various image processing functions: an exposure adjustment mechanism called auto gain control (AGC) for assigning a subject brightness threshold to the dynamic range of an imaging device on the basis of image signals taken by the imaging device comprising a CCD or a CMOS sensor; a tone adjustment mechanism called auto white balance (AWB) for correcting the tone of a subject to a proper tone; a gamma conversion mechanism for adjusting a change in gray scale and contrast; a noise removal mechanism; and an edge enhancement mechanism.

As described in Japanese Patent Laid-Open Nos. 2000-123164 and 2000-123165, recently, processes for taken image signals are being put into intelligence.

Japanese Patent Laid-Open No. 2000-123164 describes that change of a process or a conversion level in accordance with the features of an image is more preferable than execution of a predetermined process without consideration of the features of the image. Japanese Patent Laid-Open No. 2000-123165 discloses correction with emphasis on a primary subject of an image, namely, image correction appropriate to the primary subject. Particularly, for a person photograph including a person as a primary subject, in a case where a photographed image is displayed on a display screen or is printed as a hard copy output through a color printer to obtain a playback image, when various image enhancement processes or image correction processes such as color reproduction for the skin tone of the person and contrast control are different from those for other images, a person viewing the playback image receives a good impression. This fact is known.

For methods for extracting the face of a person, included in a photographed image, from the image, several methods are disclosed. For example, Japanese Patent Laid-Open No. 2001-309225 discloses a method for detecting a face using a first face candidate detection algorithm and a second algorithm. The first face candidate detection algorithm uses a pattern recognition operator for detecting a central part which may probably include the skin of a subject person on the basis of colors and shapes and detecting surrounding areas which may probably include the hair thereof on the basis of the colors and shapes to detect an area (face candidate area) which may probably include the face thereof. The second algorithm uses pattern matching to detect the presence of the face in the face candidate area obtained by the first algorithm.

Japanese Patent Laid-Open No. 8-63595 discloses the following methods. According to a first method, the edge of a skin tone area is extracted on the basis of colors, and the extracted edge is compared to a prepared face edge template to obtain the degree of matching. On the basis of the degree of matching, a face is detected. According to a second method, an eye candidate area is obtained and is compared to an eye template to obtain the degree of matching. On the basis of the degree of matching, a face is detected. According to a third method, a face candidate area obtained using a face edge template is subjected to two-dimensional Fourier transformation, prepared face template images each including eyes, a nose, a mouth, and hair are subjected to two-dimensional Fourier transformation, the amount of features to be defined is obtained on the basis of the above two-dimensional Fourier transformation results, and the amount of features is subjected to a threshold process, thus detecting a face.

Japanese Patent Application No. 2001-282283 discloses the following method: An eye candidate area is obtained. When a plurality of eye candidates are found, surrounding areas are arranged in the vicinities of an arbitrary pair of eye candidates so as to correspond to the respective eye candidates. On the basis of the directional difference between a predetermined reference gradient and a gradient in pixel value between each pixel in the surrounding area and the neighboring pixels, face detection is performed.

Recent digital cameras each have an angle (inclination) sensor therein. The angle sensor detects the photographing position of the camera (whether the camera is held longitudinally or laterally, or how much the camera is rotated from a reference position) when an image is photographed. The photographing position is set to information attached to the image. The digital camera outputs the image together with the photographing-position information as image attached information. This type of digital camera appears on the market.

General face detection methods including the above-mentioned methods for extracting the face of a person are performed on the precondition that a face to be detected is photographed so that the face of a person in an upright position is fundamentally included in an image frame. Accordingly, the orientation of the face which can be detected is restricted.

However, for photographed images, particularly, images photographed by digital cameras, a photographer holds a camera freely, for example, longitudinally, laterally, or tilts the camera in some cases. In addition, the position of a subject person is not always upright so that the whole face is photographed like a photograph for an ID card. The person may slightly tilt his or her face and he or she may be lying. Various positions can be expected.

Accordingly, a face may be freely photographed at various angles with respect to the image frame, fundamentally, in an angle range of 360 degrees. In order to detect a face at any angle, therefore, it is necessary to repeat a process of detecting a face from an image, obtained by rotating an original image, in predetermined angle increments, the predetermined angle being a reference angle range in which the face detecting process can be performed. Alternatively, it is necessary to prepare templates for pattern matching and various amounts of features used in face detection so as to correspond to all of predetermined angles and execute a face detecting process at each of the predetermined angles. In order to detect a face from a snapshot taken by a digital camera, these methods require detection time proportional to the number of times of the detecting process repeated in predetermined angle increments.

SUMMARY OF THE INVENTION

The present invention is made in consideration of the above-mentioned disadvantages of the related art. It is an object of the present invention to provide an image processing apparatus and method for detecting the face of a person included in a photographed image at higher speed, and a program storage medium in which a program used for face detection is stored.

Another object of the present invention is to extract an extraction subject at high speed using information attached to an image.

Further another object of the present invention is to provide a new function when a subject is extracted using information attached to an image.

According to the present invention, there is provided an image processing apparatus including: an image input unit for inputting an image; an image attached information input unit for inputting information attached to the image input by the image input unit; a face detection unit for detecting a face from the image input by the image input unit; a face-detection angle-range information determination unit for determining an angle range used in a process of detecting a face from the input image on the basis of the image attached information input by the image attached information input unit; and a process control unit having a mode to control the execution of the face detecting process on the basis of information indicating the angle range determined by the face-detection angle-range information determination unit.

According to the present invention, there is provided an image processing method including: an image input step of inputting an image; an image attached information input step of inputting information attached to the image input in the image input step; a face detection step of detecting a face from the image input in the image input step; a face-detection angle-range information determination step of determining an angle range used in a process of detecting a face from the input image on the basis of the image attached information input in the image attached information input step; and a process control step having a mode to control the execution of the face detecting process on the basis of information indicating the angle range determined in the face-detection angle-range information determination step.

Further objects, features and advantages of the present invention will become apparent from the following description of the preferred embodiments with reference to the attached drawings.

BRIEF DESCRIPTION OF THE DRAWINGS

FIGS. 7A and 7B show examples of an image obtained by photographing with a camera rotated counterclockwise by 90 degrees.

FIGS. 8A and 8B show examples of an image obtained by photographing with a camera rotated clockwise by 90 degrees.

DESCRIPTION OF THE PREFERRED EMBODIMENTS

Preferred embodiments of the present invention will be described hereinbelow with reference to the attached drawings.

First Embodiment

Figure 1:
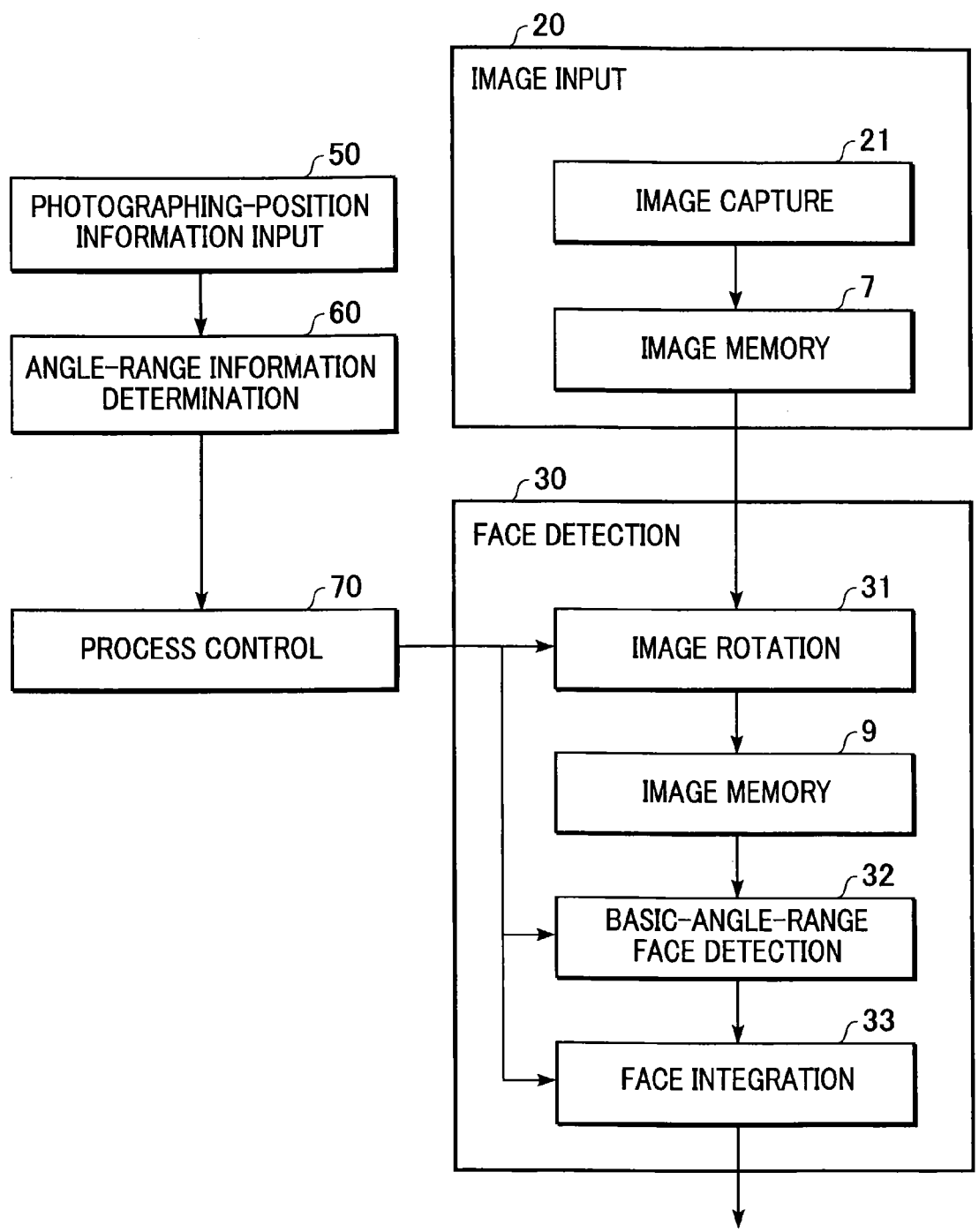
FIG. 1 is a block diagram of the structure of an image processing apparatus according to a first embodiment of the present invention.

FIG. 1 shows a functional block diagram of an image processing apparatus according to a first embodiment of the present invention. The image processing apparatus comprises an image input unit 20, a photographing-position information input unit 50, a face detection unit 30, an angle-range information determination unit 60, and a process control unit 70. The image input unit 20 comprises an image capture unit 21 comprising an interface circuit for capturing image data taken by a well-known digital camera or the like, and an image memory 7 for holding the captured image data. The image input unit 20 acquires image data obtained by photographing a scene including a primary subject. The image data acquired by the image input unit 20 is output as digital image data to the face detection unit 30.

The photographing-position information input unit 50 captures attribute data attached to an image input by the image input unit 20 through an interface circuit or the like in the same way as the image data. When photographing-position information is included in the attribute data attached to the image, the photographing-position information input unit 50 extracts this information and then supplies the extracted information to the angle-range information determination unit 60. The angle-range information determination unit 60 determines an angle range, in which a face should be detected from the image to be processed, on the basis of the information obtained from the photographing-position information input unit 50, and outputs information indicating the determined angle range to the process control unit 70. The process control unit 70 controls the face detection unit 30 to execute a face detecting process on the basis of the angle-range information determined by the angle-range information determination unit 60.

The face detection unit 30 receives an image from the image memory 7 of the image input unit 20. In the face detection unit 30, under the control of the process control unit 70, an image rotation unit 31 rotates the image by a predetermined angle of rotation to form an image and an image memory 9 holds the formed image. A basic-angle-range face detection unit 32 executes a process of detecting a face from the image, stored in the image memory 9, in a basic angle range. For the basic angle range, according to the method disclosed in Japanese Patent Application No. 2001-282283, a basic angle range is set to about ± five degrees (ten degrees) so as to include the front surface of a primary subject standing upright. In the present embodiment, the following description will be made on condition that the above-mentioned angle range of ten degrees is set to the basic angle range. When a face is detected in this range, the face detection unit 30 outputs face data to a face integration unit 33.

Under the control of the process control unit 70, on the basis of the angle-range information, the image rotation unit 31 rotates the image the necessary number of times to form images (rotation images), and the basic-angle-range face detection unit 32 repeats the process of detecting a face from each rotation image the necessary number of times while changing an angle of rotation in predetermined angle increments based on a face detectable angle of the basic-angle-range face detection unit 32. For the predetermined angle increments, for example, according to the method disclosed in Japanese Patent Application No. 2001-282283, the angle is about 10 degrees. In the present embodiment, the description will be made on condition that the rotation angle is changed in 10 degree increments. The basic-angle-range face detection unit 32 outputs images (face data) detected from the respective rotation images to the face integration unit 33. The face integration unit 33 integrates the face data detected from the respective rotation images into face information and then outputs the face information as a unit, the face information including all of the face data detected from the image input by the image input unit 20.

Figure 2:
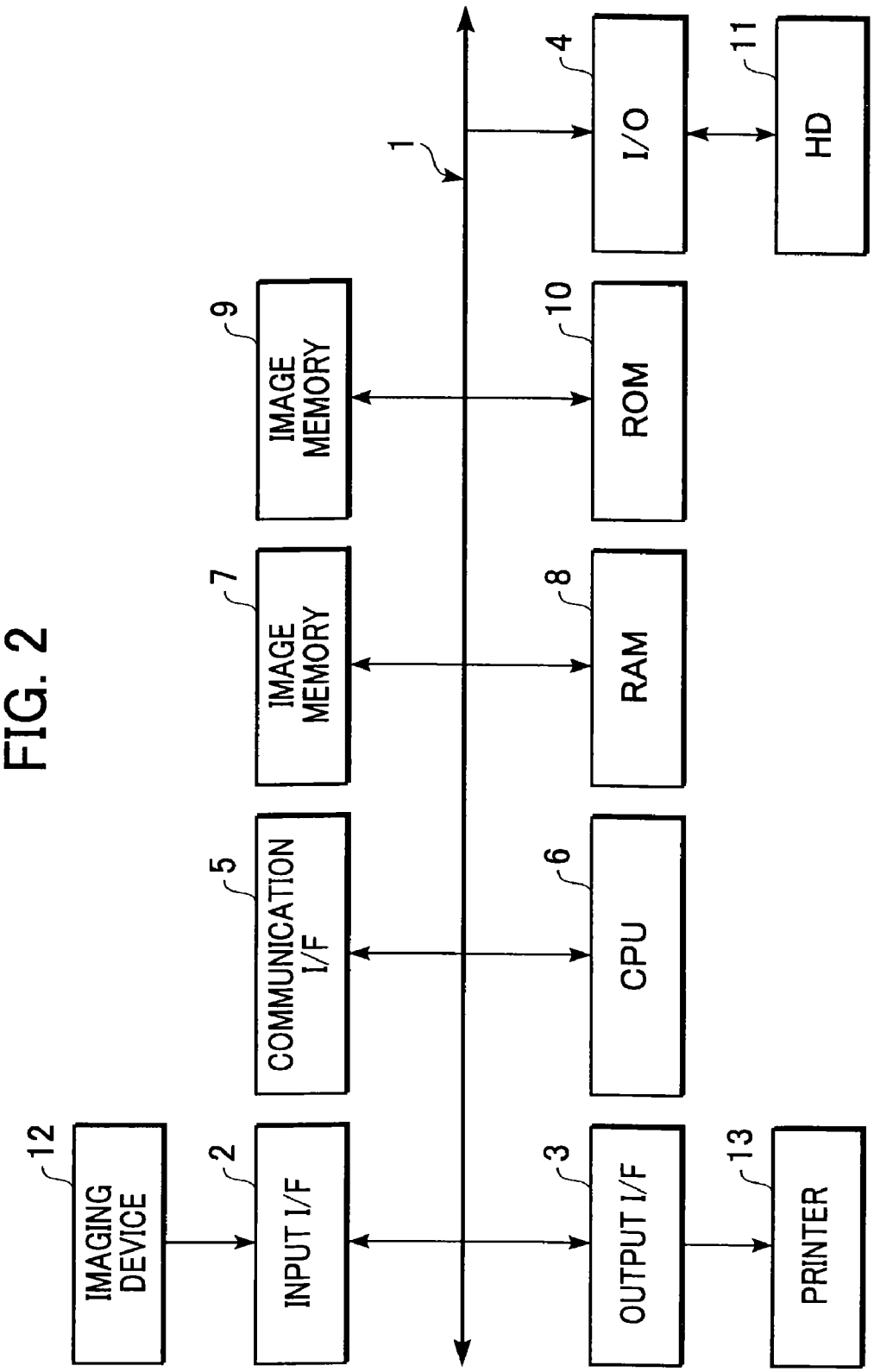
FIG. 2 is a block diagram showing an example of the arrangement of a system realizing the apparatus according to the first embodiment of the present invention.

FIG. 2 is a schematic block diagram of the arrangement of a system realizing the image processing apparatus according to the first embodiment shown in FIG. 1. A bus 1 connects respective components of the system shown in FIG. 2. An input interface (I/F) 2 constitutes the image capture unit 21 of the image input unit 20 and the photographing-position information input unit 50 in FIG. 1. An output interface (I/F) 3 outputs a high-quality image, obtained by the application of the face detecting process, to a printer. A communication interface (I/F) 5 communicates with an external apparatus via a network. The image memories 7 and 9 hold images to be processed for face detection. The image memory 7 corresponds to the image input unit 20 and holds input image data. The image memory 9 holds images formed by rotating the input image through the image rotation unit 31.

The system further includes a CPU 6, a RAM 8, a ROM 10, and an input/output circuit (I/O) 4 for receiving data and transmitting data from/to a hard disk drive 11. An imaging device 12 such as a digital camera supplies image data and data attached to the image data to the image input unit 20. A printer 13 prints an output image.

The above components 1 to 11 constitute the computer system. This computer system has the arrangement realizing the functional blocks: the image capture unit 21 in the image input unit 20, the image rotation unit 31 and the basic-angle-range face detection unit 32 and the face integration unit 33 in the face detection unit 30, the photographing-position information input unit 50, the angle-range information determination unit 60, and the process control unit 70.

The operation of the image processing apparatus according to the first embodiment will now be described with reference to a flowchart of FIG. 3. In step S10, an image to be processed is supplied from the imaging device (digital camera) 12 to the image memory 7 via the input I/F 2 to store the processed image in the image memory 7. The operation proceeds to step S20.

In step S20, data attached to the processed image is supplied from the imaging device 12 to the RAM 8 via the input I/F 2 to store the data in a predetermined area (not shown) in the RAM 8. This data will also be referred to as image attached information hereinbelow. The operation proceeds to step S30.

In step S30, whether significant photographing-position information is included in the image attached information stored in the predetermined area (not shown) in the RAM 8 in step S20 is determined. If YES, the operation proceeds to step S40. If NO, the operation proceeds to step S80.

Whether the image attached information includes significant photographing-position information can be determined by checking information written in a predetermined area of the image attached information. In this case, when zero is written, there is no significant photographing-position information. When a value in a range of 1 to 360 is written, the image attached information includes significant photographing-position information.

Figure 6:
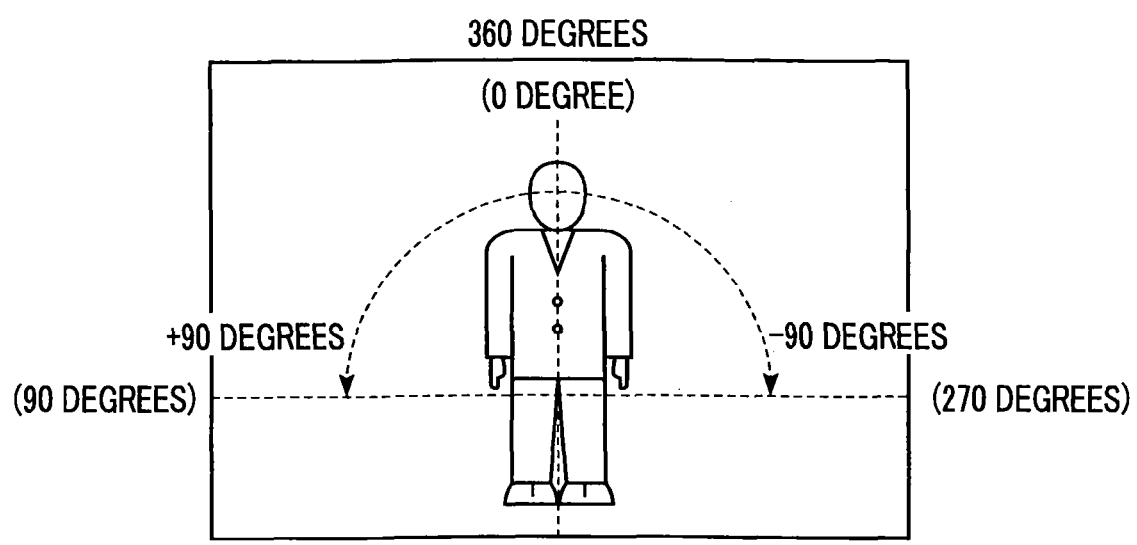
FIG. 6 shows an example of an image obtained by photographing with a camera in the normal position.

An example of attached information will now be described with reference to FIGS. 6 to 8B. FIG. 6 shows an example of an image photographed when a photographer holds a camera in the normal position (namely, he or she holds the camera without rotating it). That is, FIG. 6 shows the image obtained by photographing a person in an upright posture as a subject. At this time, a value indicating that the upright posture can be recognized as an upright position is written in the predetermined area, in which photographing-position information should be stored, in the image attached information. In this case, it is assumed that 360 is written.

FIGS. 7A and 7B show examples of an image photographed when the photographer rotates the camera counterclockwise by 90 degrees and longitudinally holds the camera so as to take a vertically oriented picture. In other words, when a subject person looks this camera, the camera is rotated clockwise by 90 degrees. FIG. 7A shows the image obtained by photographing the person in an upright posture as a subject. FIG. 7B shows the photographed image on the assumption that the subject is photographed without rotating the camera. At this time, a value indicating that the horizontally oriented image with a head at the right can be recognized as an upright position is written in the predetermined area, in which the photographing-position information should be stored, in the image attached information. In this case, it is assumed that 270 is written.

FIGS. 8A and 8B show examples of an image photographed when the photographer rotates the camera clockwise by 90 degrees and laterally holds the camera so as to take a vertically oriented picture. In other words, when a subject person looks this camera, the camera is rotated counterclockwise by 90 degrees. FIG. 8A shows the image obtained by photographing the person in an upright posture as a subject. FIG. 8B shows the photographed image on the assumption that the subject is photographed without rotating the camera. At this time, a value indicating that the horizontally oriented image with a head at the left can be recognized as an upright position is written in the predetermined area, in which the photographing-position information should be stored, in the image attached information. In this case, it is assumed that 90 is written.

In step S40, on the basis of the photographing-position information obtained in step S30, an angle range in which face detection should be performed is determined. The determined angle range is set as angle-range information in a predetermined area in the RAM 8. Specifically speaking, a set of values, obtained by adding 90 to a value of the photographing-position information obtained in step S30 and subtracting 90 from the above value, are stored in the predetermined area in the RAM 8. In the case of FIGS. 7A and 7B, since 270±90, 180 and 360 are set. In the case of FIGS. 8A and 8B, since 90±90, zero and 180 are set. In the case of FIG. 6, since 360±90, 270 ad 450 are set. If the process of step S40 is completed, the operation proceeds to step S50.

In step S80, zero and 360 are set as angle-range information in the predetermined area in the RAM 8. If the process of step S80 is completed, the operation proceeds to step S50.

In step S50, on the basis of the angle-range information set in step S40 or S80, the process of detecting a face from an image (rotation image) formed by rotating the image every predetermined angle is repeated in the angle range while the angle of rotation is being changed in predetermined angle increments based on the face detectable angle of the basic-angle-range face detection unit 32. For the predetermined angle increments, for example, an angle of about ten degrees is used in the case of Japanese Patent Application No. 2001-282283. In the present embodiment, the description will be continued on condition that the rotation angle is changed in 10 degree increments. All of face data detected from the respective rotation images are output to another predetermined area in the RAM 8. If the face detecting process in the angle range is terminated, the operation proceeds to step S60. The process of step S50 will be described in detail later.

In step S60, if the face data includes overlaps, the face data being detected in the process performed every predetermined angle in the angle range in step S50, the overlapping data is eliminated. In addition, if a plurality of different pieces of face data are remaining, those pieces of face data are integrated into data detected from one input image. The integrated data is stored in a predetermined area in the RAM 8. The operation proceeds to step S70.

In step S70, the face data stored in the RAM 8 in step S60 is stored as new attached information in the hard disk drive 11 via the I/O 4 together with the input image data. Alternatively, the face data is output via the communication I/F 5 to another external system, which is operated simultaneously with the imaging device 12. Alternatively, the face data is transmitted to another process which is executed in the computer system shown in FIG. 2. After that, a series of processing steps of the operation are terminated.

Figure 9:
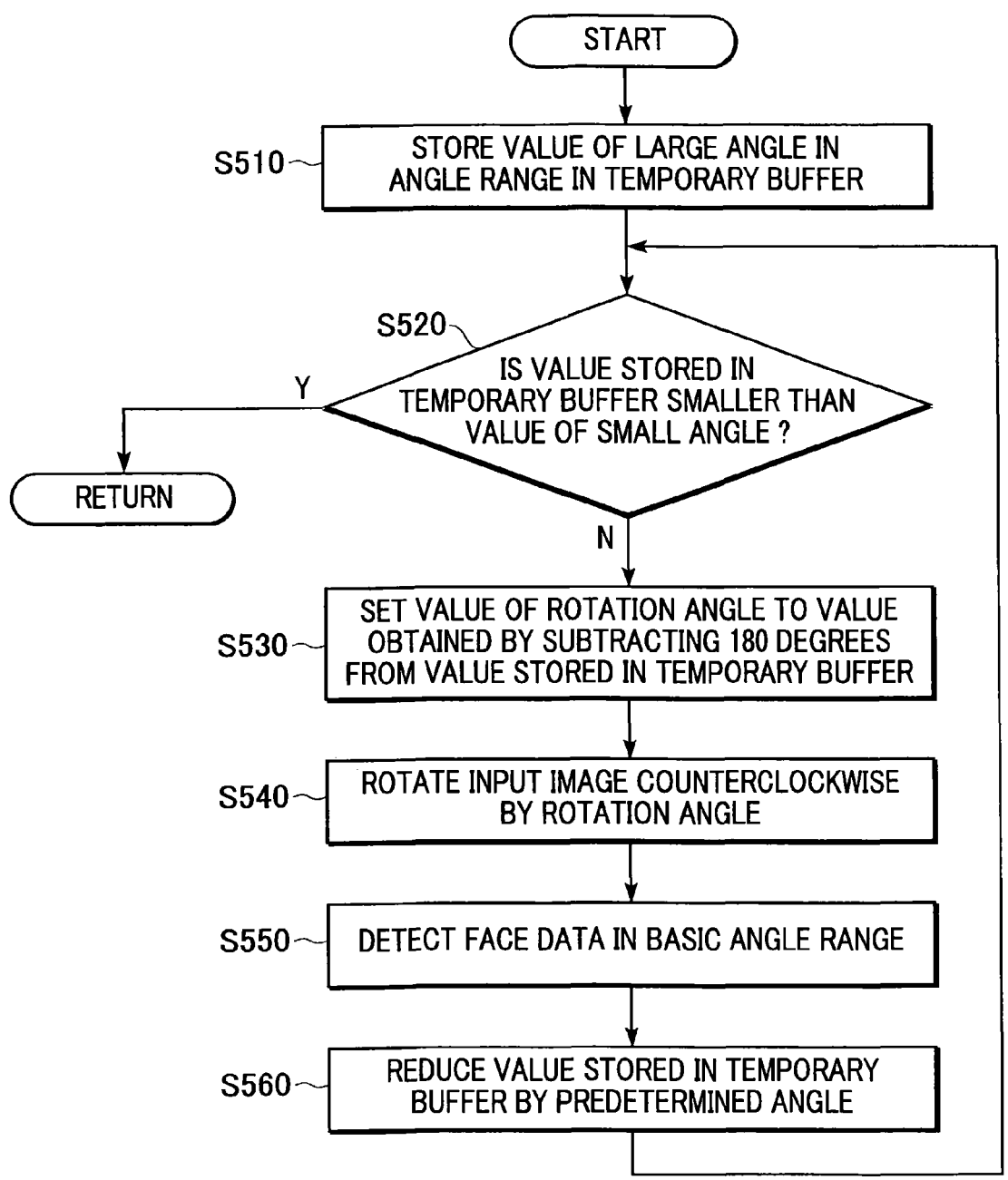
FIG. 9 is a flowchart of the detailed process of step S50.

The process of step S50 will now be described in detail with reference to a flowchart of FIG. 9. In step S510, a value of a large angle of the angle-range information set in the predetermined area in the RAM 8 in step S40 or S80 is stored in a temporary buffer. The process proceeds to step S520.

In step S520, whether the value stored in the temporary buffer is smaller than a value of a small angle of the angle-range information set in the predetermined area of the RAM 8 in step S40 or S80 is determined. If YES, it is determined that the face detecting process is completed in the whole angle range and the process of step S50 is terminated. If NO, the process proceeds to step S530.

In step S530, 180 is subtracted from the value stored in the temporary buffer. The obtained value is set as a value of the rotation angle in another predetermined area of the RAM 8. The process proceeds to step S540.

In step S540, the value of the rotation angle set in step S530 is set to an angle to be used for a process of rotating the input image stored in the image memory 7. According to a well-known image rotation processing method (affine transformation using the center of an input image as a center of rotation), the input image is rotated to the left (counterclockwise) by the rotation angle to form an image. The formed image is stored in the image memory 9. The process proceeds to step S550.

In step S550, the image stored in the image memory 9 is subjected to a well-known face detecting process. The detection result is generated to another predetermined area in the RAM 8. The process proceeds to step S560. In the description, it is assumed that the method disclosed in Japanese Patent Application No. 2001-282283 is used as the well-known face detecting process. The above-mentioned other methods and various face detecting methods can also be used.

In step S560, a face detectable angle range peculiar to the face detecting method which is currently used is set to a predetermined angle. For the predetermined angle, for example, in the method disclosed in Japanese Patent Application No. 2001-282283, an angle of about ten degrees is used. In the present embodiment, similarly, the predetermined angle is set to ten degrees. A value of the predetermined angle is subtracted from the value stored in the temporary buffer. The obtained value is reset as a new value to be stored in the temporary buffer. The process is returned to step S520.

As mentioned above, if there is significant angle-range information, the number of repeating times of the face detecting process can be remarkably reduced as compared to that of a case where there is no significant angle-range information. If there is no significant angle-range information, in the above example, the face detecting process is repeated in 10 degree increments in the angle range of 360 degrees. Thus, it is necessary to repeat the rotating process and the face detecting process 36 times. On the other hand, if there is significant angle-range information, the rotating process and the face detecting process are repeated 19 times. Accordingly, processing time can be reduced to substantially the half.

For example, significant photographing-position information corresponds to information regarding "Orientation" as a field name in Exif IFD defined in Exchangeable Image Format (Exif) as a file format used for recording primary image data and information attached to the data upon photographing with a digital camera, Exif being one of standards of Japan Electronics and Information Technology Industries Association (JEITA).

Second Embodiment

According to the first embodiment, in step S50, the input image is rotated to form an image, the formed image is subjected to the face detecting process, and the series of processing steps are repeated to execute the face detection in the whole of the face detection angle range. However, face detection is not limited to this case.

In other words, as another face detecting method, a pattern recognition method using matching between input image data and each of various templates prepared fundamentally is used. The templates are used as reference data. An input image is not rotated. While the template as reference data is being changed into a template corresponding to the rotation angle every predetermined angle, the face detecting process is executed.

Figure 4:
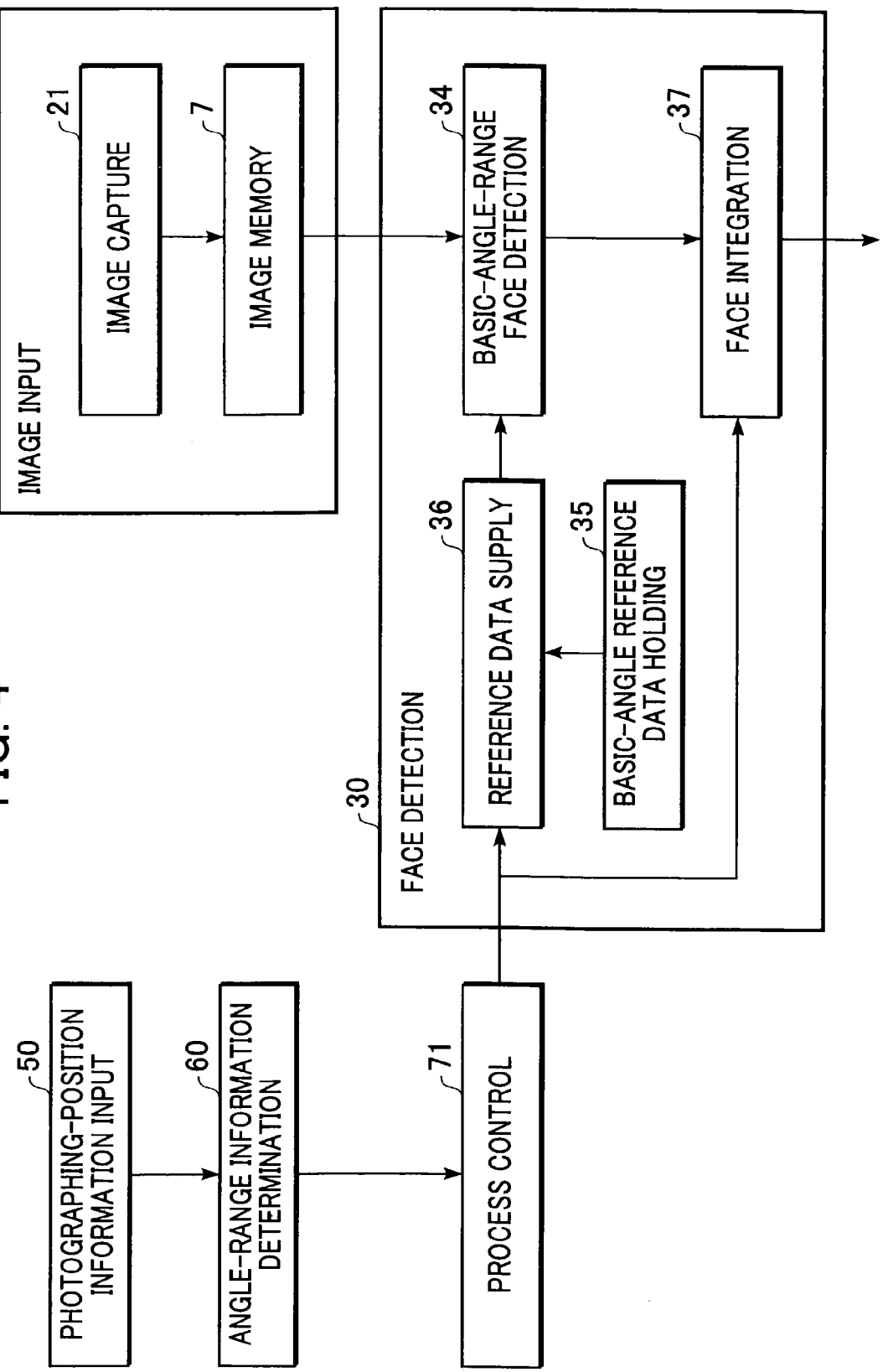
FIG. 4 is a block diagram of the structure of an image processing apparatus according to a second embodiment of the present invention.

FIG. 4 shows a block diagram of an image processing apparatus according to the second embodiment, the apparatus having the above-mentioned operation and functions. The second embodiment differs from the first embodiment with respect to a point that an input image is not rotated and reference data for pattern matching is rotated in the face detection unit 30. Accordingly, the image memory 9 is removed. In addition to functional blocks similar to those in FIG. 1, the image processing apparatus further includes a basic-angle reference data holding unit 35 for holding template data as reference data used for pattern matching, and a reference data supply unit 36 for performing a rotating process to the reference data to form reference rotation data and then providing the formed data to a basic-angle-range face detection unit 34.

Figure 3:
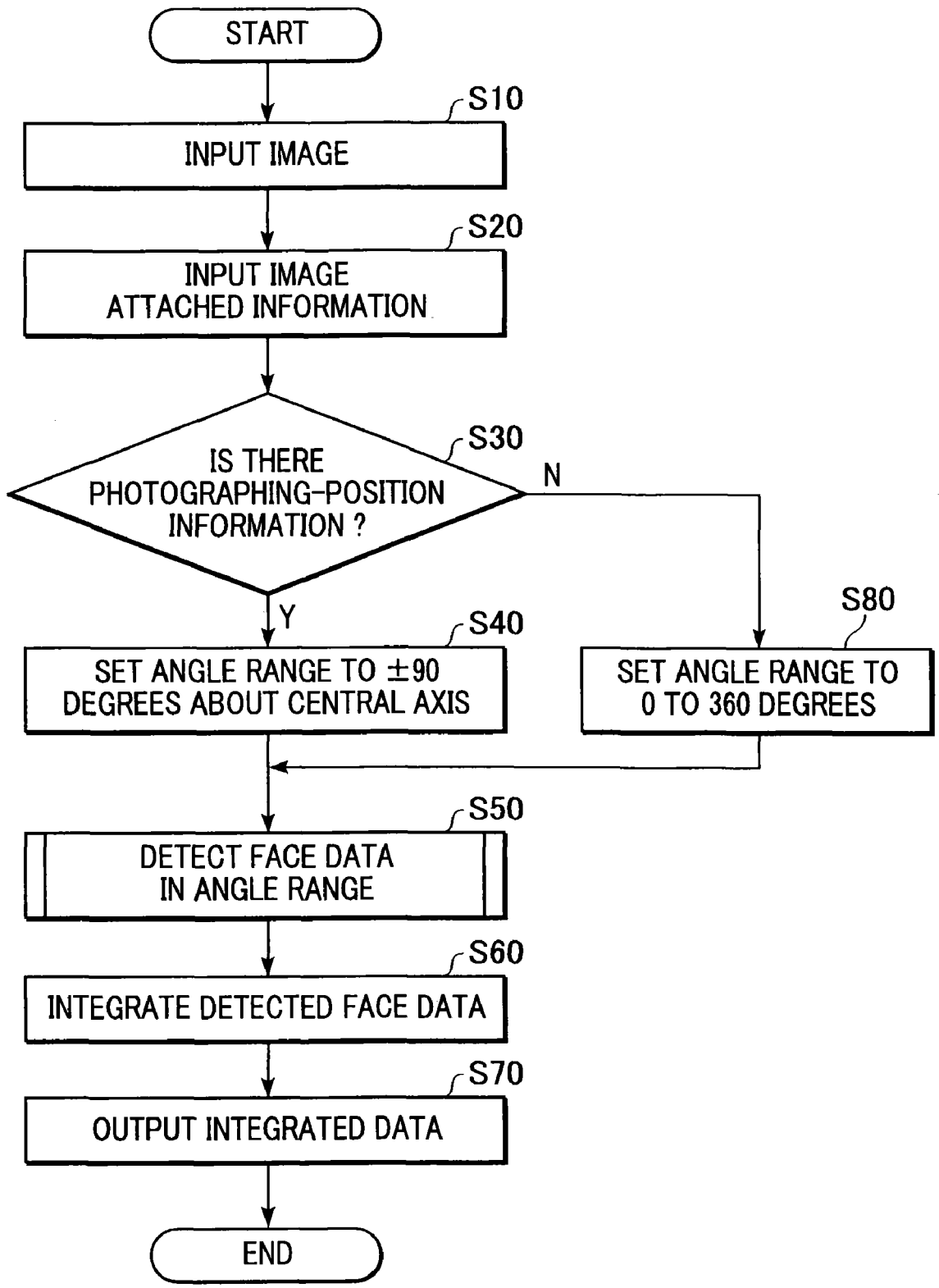
FIG. 3 is a flowchart of the operation of the apparatus according to the first embodiment.

When the arrangement shown in FIG. 2 realizes the image processing apparatus comprising the functional blocks shown in FIG. 4, fundamentally, the operation similar to that of FIG. 3 can be performed. However, step S540 in the flowchart of FIG. 9 is changed. According to the first embodiment, the input image itself is rotated to form a rotation image in step S540. According to the second embodiment, template data as reference data used in pattern matching is rotated to form reference rotation data in step S540, and the formed data is provided in step S550.

In many cases, a load applied to the process of rotating reference data is smaller than that for input image data. Accordingly, the operation can be performed at higher speed.

Third Embodiment

As a modification of the first and second embodiments, a third embodiment will now be described. According to the third embodiment, a dual face detecting process is executed. In other words, the following two processes can be simultaneously performed: In a first process, an input image is rotated to form a rotation image and the formed image is subjected to the face detecting process. On the other hand, in a second process, the input image which is not rotated is subjected to a matching process using a rotated template pattern and the matched image is subjected to the face detecting process.

Figure 5:
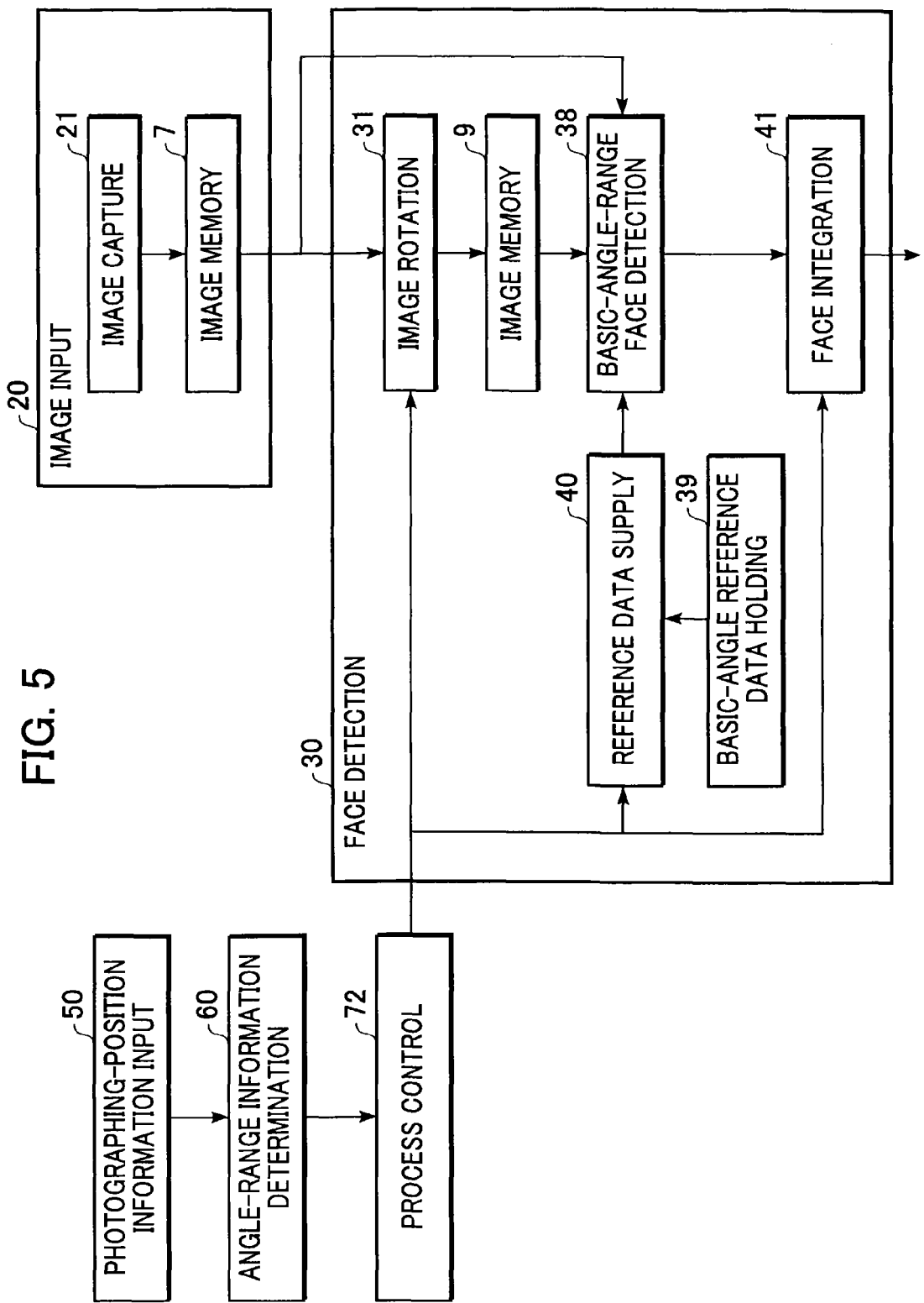
FIG. 5 is a block diagram of the structure of an image processing apparatus according to a third embodiment of the present invention.

FIG. 5 shows a block diagram of an image processing apparatus according to the third embodiment. Differently from the first and second embodiment, both of an input image and reference data for pattern matching are rotated in the face detection unit 30. Accordingly, the image processing apparatus includes the image memory 9, a basic-angle reference data holding unit 39 for holding template data as reference data used for pattern matching, a basic-angle-range face detection unit 38, and a reference data supply unit 40 for performing the rotating process to reference data to form reference rotation data and supplying the formed data to the basic-angle-range face detection unit 38. An input image itself and an image formed by rotating the input image are also input to the basic-angle-range face detection unit 38.

When the arrangement shown in FIG. 2 realizes the image processing apparatus comprising the functional blocks shown in FIG. 4, fundamentally, the operation similar to that of FIG. 3 can be performed. However, step S540 in the flowchart of FIG. 9 is changed. In other words, according to the third embodiment, in step S540, an input image itself is rotated to form a rotation image and template data as reference data used for pattern matching is rotated to form reference rotation data. Both of the formed image and the reference rotation data are provided in step S550. In step S550, the face detecting process is performed to the rotation image formed by rotating the input image. Simultaneously, the input image which is not rotated is subjected to the matching process using a rotated template pattern. As mentioned above, the two processes are simultaneously performed.

According to the third embodiment, the face detection result can be obtained with more accuracy than that of only one face detecting process. According to the first to third embodiments, image data and photographing-position information are supplied from the input I/F 2. The face detection can also be performed to image data and photographing-position information supplied from the communication I/F 5 via the network.

Other Embodiment

The object of the present invention can also be accomplished as follows: A storage medium, in which program codes of software to realize the functional blocks serving as a host and terminals according to each of the first to third embodiments are stored, is supplied to a system or an apparatus. A computer (or a CPU or an MPU) of the system or apparatus reads the program codes stored in the storage medium to execute the program codes. In this case, the program codes read from the storage medium realize the functions of each embodiment. The present invention includes the storage medium in which the program codes are stored.

As a storage medium providing the program codes, a ROM, a flexible disk, a hard disk, an optical disk, a magneto-optical disk, a CD-ROM, a CD-R, a magnetic tape, and a nonvolatile memory card can be used.

Further, the present invention also includes the following case. Program codes read by a computer are executed to realize the functions of each embodiment. In addition, on the basis of indications of the program codes, an OS, which is running on the computer, executes a part or all of actual processes to realize the functions of each embodiment.

Further, the present invention also includes the following case. Program codes read from a storage medium are written in a memory provided for a feature expansion board inserted in a computer or a feature expansion unit connected to the computer. On the basis of indications of the program codes, a CPU, which is provided for the feature expansion board or feature expansion unit, executes a part or all of actual processes to realize the functions of each embodiment.

As mentioned above, photographing-position information attached to an input image is also input, and the photographing-position information is effectively used to determine information indicating an angle range used to detect a face from the input image serving as a face detection target, thus limiting the angle range. Consequently, a face which may be included in the image can be detected in various angle ranges at higher speed than that of the related art.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   image input means for inputting an image that includes a person's head;
   photographing-position information input means for inputting photographing-position information of a camera that photographs the image, the photographing-position information being attached to the image input by the image input means, the photographing-position information input means being able to input four values, one of which is attached to the input image, the four values being a) a first value indicating that no significant photographing-position information is inputted, b) a second value indicating that an upright posture of the image is to be recognized as an upright position of the image, c) a third value indicating that a horizontally-oriented image with the person's head at the right is to be recognized as an upright position of the image and d) a fourth value indicating that a horizontally-oriented image with the person's head at the left is to be recognized as an upright position of the image;
   face-detection angle-range information determination means for determining a first angle range used in a process of detecting a face from the input image when the value attached to the input image is the first value, a second angle range used in a process of detecting a face from the input image when the value attached to the input image is the second value, a third angle range used in a process of detecting a face from the input image when the value attached to the input image is the third value, and a fourth angle range used in a process of detecting a face from the input image when the value attached to the input image is the fourth value, wherein the first, second, third, and fourth angle ranges are different from each other, wherein the first angle range is broader than the second, third, and fourth angle ranges; and process control means having a mode to control the execution of the face detecting process on the basis of the determined angle range determined by the face-detection angle-range information determination means.

2. The apparatus according to claim 1, wherein the process control means controls the execution of the face detecting process in predetermined angle increments.

3. The apparatus according to claim 1, further comprising:

image rotation means for rotating the input image, wherein the process control means allows the image rotation means to rotate the input image in order to form images in predetermined angle increments, and performs the face detecting process to the respective images.

4. The apparatus according to claim 1, further comprising:

reference data conversion means for converting face detection reference data used for face detection into reference data for a tilted face, wherein the process control means allows the reference data conversion means to convert the face detection reference data into reference data for a tilted face in order to form tilted-face, reference data in predetermined angle increments, and executes the face detecting process to the input image using the formed tilted-face reference data.

5. An image processing method comprising:

an image input step of inputting an image;

a photographing-position information input step for inputting photographing-position information of a camera that photographs the image, the photographing-position information being attached to the image input in the image input step, the photographing-position information input step being able to input four values, one of which is attached to the input image, the four values being a) a first value indicating that no significant photographing-position information is inputted, b) a second value indicating that an upright posture of the image is to be recognized as an upright position of the image, c) a third value indicating that a horizontally-oriented image with the person's head at the right is to be recognized as an upright position of the image, and d) a fourth value indicating that a horizontally-oriented image with the person's head at the left is to be recognized as an upright position of the image;

a face-detection angle-range information determination step of determining a first angle range used in a process of detecting a face from the input image when the value attached to the input image is the first value, a second angle range used in a process of detecting a face from the input image when the value attached to the input image is the second value, a third angle range used in a process of detecting a face from the input image when the value attached to the input image is the third value, and a fourth angle range used in a process of detecting a face from the input image when the value attached to the input image is the fourth value, wherein the first, second, third, and fourth angle ranges are different from each other, wherein the first angle range is broader than the second, third, and fourth angle ranges; and a process control step having a mode to control the execution of the face detecting process on the basis of the determined angle range determined in the face-detection angle-range information determination step.

6. The method according to claim 5, wherein in the process control step, the execution of the face detecting process is controlled in predetermined angle increments.

7. The method according to claim 5, further comprising:

an image rotation step of rotating the input image, wherein in the process control step, images are formed in predetermined angle increments by rotating the input image in the image rotation step, and the face detecting process is performed to the respective formed images.

8. The method according to claim 5, further comprising:

a reference data conversion step of converting face detection reference data used for face detection into reference data for a tilted face, wherein in the process control step, tilted-face reference data is formed in predetermined angle increments by converting the face detection reference data into reference data for a tilted face in the reference data conversion step, and the face detecting process is performed to the input image using the formed tilted-face reference data.

9. A computer-system executable program which is stored on a computer-readable medium and allows a computer system for executing the program to operate as the image processing apparatus according to claim 1.

10. A computer-program storage medium in which a computer program is stored, the program realizing the image processing method according to claim 5 and indicating operating procedures of steps included in the method.

11. A computer program which is stored on a computer-readable medium for realizing the image processing method according to claim 5 and indicating operating procedures of steps included in the method.

* * * * *